United States Patent [19]
Isaksson

[11] Patent Number: 5,838,781
[45] Date of Patent: Nov. 17, 1998

[54] METHOD AND ARRANGEMENT OF ESTABLISHING BEARER CAPABILITY INFORMATION ON A CALL INCOMING TO AN ISDN EXCHANGE

[75] Inventor: Leif Isaksson, Tyresö, Sweden

[73] Assignee: Telefonaktiebolaget LM Ericsson, Stockholm, Sweden

[21] Appl. No.: 760,264

[22] Filed: Dec. 5, 1996

Related U.S. Application Data

[60] Provisional application No. 60/008,626 Dec. 18, 1995.

[30] Foreign Application Priority Data

Dec. 15, 1995 [SE] Sweden ................... 95044996

[51] Int. Cl.⁶ ..................................... H04M 7/00
[52] U.S. Cl. ............... 379/229; 379/231; 370/426; 370/467
[58] Field of Search ................... 370/384, 426, 370/466, 467, 469, 524; 379/219, 229, 230, 233, 231

[56] References Cited

U.S. PATENT DOCUMENTS

| | | | |
|---|---|---|---|
| 5,233,648 | 8/1993 | Nakamura | 379/233 |
| 5,289,536 | 2/1994 | Hokari | 379/221 |
| 5,414,760 | 5/1995 | Hokari | 379/93 |
| 5,530,724 | 6/1996 | Abrams et al. | 375/345 |
| 5,631,958 | 5/1997 | Reese et al. | 379/410 |

FOREIGN PATENT DOCUMENTS 489619  6/1992  European Pat. Off. .

OTHER PUBLICATIONS

International–Type Search Report re Swedish Application No. 9504499–6 Date of mailing: Sep. 11, 1996.

*Primary Examiner*—Daniel S. Hunter
*Attorney, Agent, or Firm*—Burns, Doane, Swecker & Mathis, L.L.P.

[57] ABSTRACT

The present invention relates to a method and an arrangement for establishing a bearer capability classification of a received, incoming call to an ISDN exchange, the received call has a directory number, but no or faulty bearer capability classification. The method includes the steps of setting a default bearer capability to the call and if the call requires a different bearer capability then the bearer capability is being converted to the required bearer capability class.

5 Claims, 3 Drawing Sheets

| ISDN | DIRECTORY NUMBER | BEARER CAPABILITY BC CLASSIFICATION |
|---|---|---|
| A | 2019 | 3.7 kHz AUDIO |
| B | 2020 | 64 k UNRESTRICTED |
| C | 2021 | 64 k UNRESTRICTED |
| D | 2022 | 64 k UNRESTRICTED |
| E | 2030 | 7 k AUDIO |
| F | 2031 | 7 k AUDIO |
| G | 2032 | 7 k AUDIO |

Fig. 2

METHOD AND ARRANGEMENT OF ESTABLISHING BEARER CAPABILITY INFORMATION ON A CALL INCOMING TO AN ISDN EXCHANGE

TECHNICAL FIELD OF THE INVENTION

The present invention relates to a method and a system used when Integrated Services Digital Network ISDN telecommunication networks interact with non-ISDN telecommunication networks. More particularly, the invention relates to revive of ISDN information elements in a Privat Branch Exchange, in the case of receiving a non ISDN call or an ISDN call which has lost the ISDN information elements, for instance in non-ISDN networks.

DESCRIPTION OF RELATED ART

ISDN terminals and call set-up in an ISDN environment uses a number of Information Elements to classify the calls. Unfortunately, these Information Elements are not carried in traditional, CAS (Channel Assosiated Signalling) based networks, i.e. digital or analogue non intelligent networks and are often not carried for international connections. Important Information Elements are Bearer Capability and Teleservice. The purpose of the Bearer Capability is primarily to instruct the transport network on how to handle specific calls. A PBX may handle the following Bearer Capabilities (BC). Speech, 3.1 kHz Audio, 64 kbit Unrestricted Digital Information, 64 kbit Restricted Digital Information and 7 kHz Audio. The Bearer Capability is a mandatory Information Element, i.e. it is always forwarded with all call set-ups.

The bearer capability BC speech is used for an ordinary voice call and the network may route the call over analogue circuits and may use voice compression, echo cancellation and echo suppresion for instance.

The bearer capability BC 3.1 kHz Audio is used for voice grade information, i.e. non voice calls but where the information is coded as analogue signals within the 300 Hz to 3.1 kHz frequency band. This is typically used for modems, e.g. ordinary data or telefax. For these calls, the network may route the call over analogue circuits, but may not use voice compression or echo cancellation/suppression. It should be noted that this is the bearer capability that an ISDN network today will allocate to a call which does not have any bearer capability allocated, e.g. a call arriving from a CAS environment.

The bearer capability 64 kbit Unrestricted (Unr.) is used for calls where the information is digitally coded, i.e. data of some description. This type of connection is often referred to as Clear Channel. It can for instance be a Video applic application or a Group four fax. For these calls, the network may not route the call over analogue circuits and may not use voice compression or echo cancellation/suppression as the digital bitstream must be absolutely unaffected.

The bearer capability 64 kbit Restricted (R) is digitally coded information at 56 kbit/s. The reason for this bearer capability is some American 1.5 Mbit CAS networks where only seven of the eight Pulse Code Modulated (PCM) bits can be used. The least significant bit is used for signalling and this method is called "Bit robbing". This BC is used in the same way as the BC 64 kbit Unrestricted. Some networks charges less for this type of call than for a full 64 bit unrestricted. This BC is only supported in US ISDN protocols, thus making international calls with bearer capability impossible.

The bearer capability 7 kHz Audio which is also called Unrestricted Digital Information with Tones and Announcements (UDI-TA) is digitally coded information at 64 kbit/s. This BC is used for e.g. video calls and high quality HIFI telephone calls.

Known PBX's supports an impressive number of different signalling systems. Signalling systems can be split in two main categories, Common Channel Signalling (CCS) systems and Channel Associated Signalling (CAS) systems. The majority of signalling systems utilises the CAS system and CAS does not carry any equivalent to the ISDN Bearer Capability or Teleservice information. As the Bearer Capability is mandatory information in element in ISDN networks, any exchange operating as gateway must thus generate this information for each incoming call that is switched to an ISDN user or ISDN trunk. A receiving exchange/multiplexor/terminal/application may use this information in order to control the subsequent handling of the call. E.g. a telephone exchange will not select an analogue outgoing circuit for a call with bearer capability 64 kbit Unrestricted.

A call arriving on a CAS interface to a ISDN Private Branch Exchange PBX have lost the Bearer Capability (BC) Information Elements which are necessary for the ISDN PBX. The problem is today solved in this way. The PBX associates a default Bearer Capability to the call since no other information is available from the CAS interface. The default Bearer Capability is 3.1 kHz Audio which is appropriate for most calls but not for all. If the call is destinated to a digital fax application e.g. a group four fax, which requires 64 kbit/s unrestricted information, the call may fail, depending on the capability of the receiving terminals.

Thus, the problem is that calls, arriving in a PBX, which calls require a Bearer Capability other than 3.1 kHz Audio may fail or is being answered by the wrong terminal.

It is today possible to connect a fax recognition card a fax application. Then, a fax call will be answered by the fax machine instead of another application.

The problem does not arise when there is an end-to-end ISDN connection. In an end-to-end ISDN connection the bearer capability will not be lost because all ISDN networks and elements handles the bearer capability information.

SUMMARY OF THE INVENTION

The invention is related to a method and an arrangement of establishing Bearer Capability (BC) information in an ISDN exchange such as a PBX. The purpose of the invention is to guarantee end-to-end connectivity for ISDN applications even if the intervening network has no ISDN support. The invention includes that an incoming call the system sets a default bearer capability to an incoming call. The default bearer capability is in a preferred embodiment SPEECH. After that a bearer capability conversion is made in case the incoming call requires a bearer capability which is differing from the default bearer capability. The conversion is made if the directory number of the incoming call is equivalent to any directory number which requires a bearer capability differing from the default bearer capability.

A first advantage obtained when implementing the invention is that all ISDN calls will be safely connected to the called application, for instance a digital fax machine, although there is no bearer capability classification associated with the call when the call arrives to an exchange.

A second advantage is that there is no need for a fax recognition card.

BRIEF DESCRIPTION OF THE DRAWINGS

A more complete understanding of the method and system of the present invention may be had by reference to the detailed description following, taken in conjunction with the accompanying drawings, wherein:

FIG. 2 illustrates a bearer capability conversion table and FIG. 3 is a flow chart describing the inventive method.

DESCRIPTION OF PREFERRED EMBODIMENT

Figure 1:
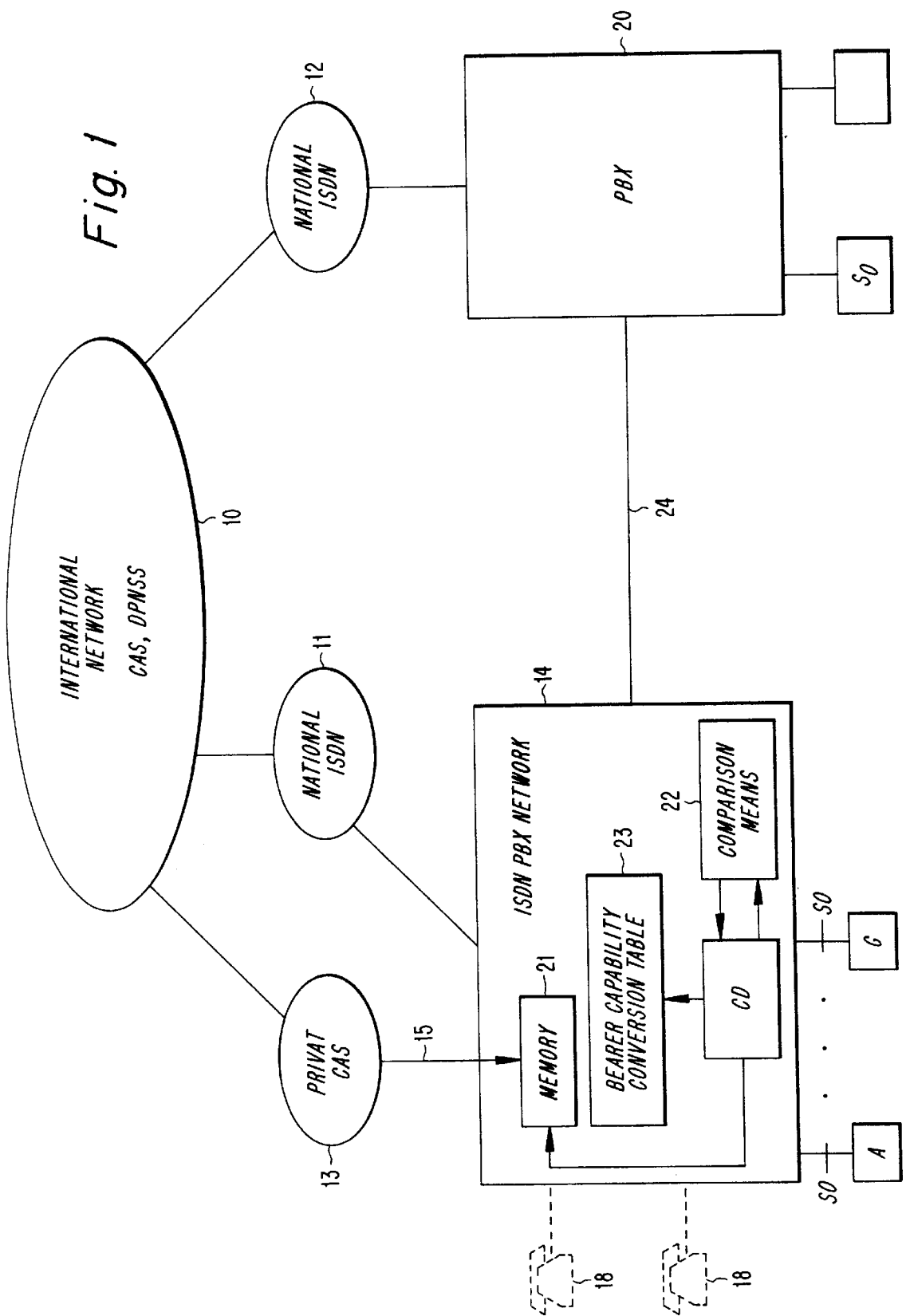
FIG. 1 is a block diagram of a telecommunication system including an International network, national ISDN networks, Privat CAS networks and ISDN Privat Branch Exchanges PBX.

FIG. 1 is an overview of a telecommunication network including an International network 10 connected to national ISDN networks 11,12 and a Privat CAS network 13. A first ISDN PBX network 14 is connected to the Privat network 13 and the National ISDN network 11. The privat CAS network 13 is connected to the PBX network 14 with a CAS trunk 15. The first ISDN PBX network 14 includes in this example one PBX which have telephones 18 connected and ISDN terminals/applications A,B,C,D,E,F,G connected via ISDN interface SO. The telephones requires a first class of bearer capability SPEECH and the ISDN applications A–G requires any from a second group of bearer capability classes other than SPEECH. To the second group of bearer capability classes belong 3.1 kHz Audio, 64 kbit Unrestricted, 64 kbit Restricted and 7 kHz Audio. The first ISDN PBX network 14 is in this example connected to a second ISDN PBX network 20, similar to the first ISDN PBX network 14.

The ISDN applications A–G are given a unique directory number, i.e. one Multiple Subscriber Number MSN must be reserved on applicable SO interfaces for this purpose. If an S0 ISDN interface handles speech, data, a group 4 fax or video one MSN must be allocated to each application which requires a specific bearer capability. The applicable MSNs must be entered in a bearer capability conversion table with information which specifies conversion of bearer capability. For instance an MSN may be all directory numbers 21xx. It could be directory numbers 2101, 2102 2103 and so on. Thus, a group of directory numbers may be associated with a specific bearer capability class. The bearer capability conversion table may be implemented together with a list of required Teleservice. The bearer capability conversion table may also be implemented together with a number conversion table.

FIG. 2 shows a bearer capability conversion table 23 within the PBX. The table 23, wich is connected to the Central Processor CP, comprises every directory number to a ISDN applications having a bearer capability within the second group of classes. In this example every directory number with a bearer classification different from SPEECH is listed but instead a group of directory numbers (MSN) could be used. The terminal A is given the directory number 2019 and require the bearer capability 3.1 kHz Audio. The terminal B is given directory number 2020, terminal C number 2021 and terminal D number 2022 These three terminals require all 64 kbit Unrestricted. Terminal E is given directory number 2030, terminal F number 2031 and G number 2032. These three terminals require all 7 kHz Audio.

Figure 3:
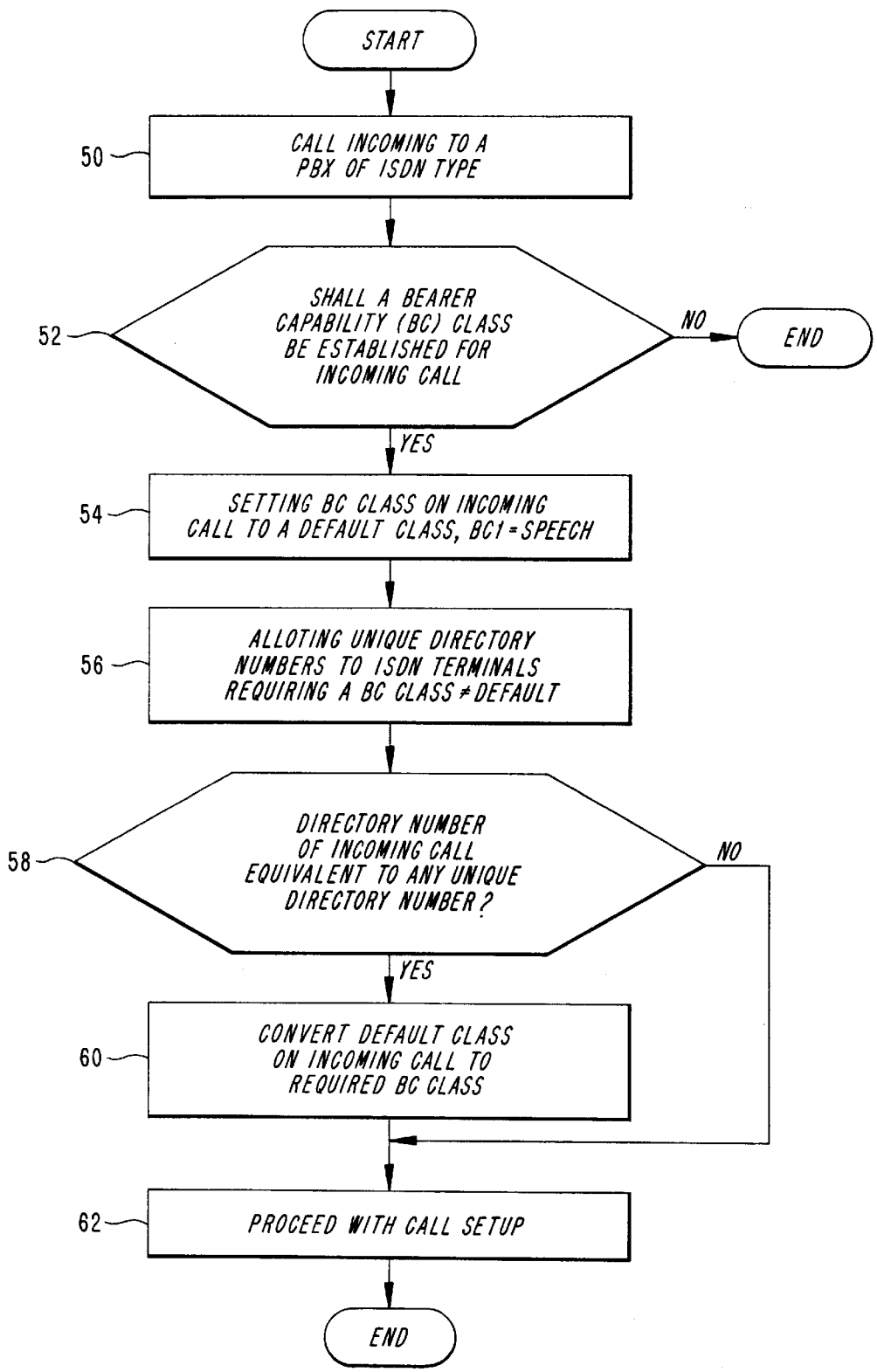

FIG. 3 is a flow chart illustrating the different method steps that are taken in a preferred embodiment of the invention. See also FIG. 1 during description of the method steps.

At step 50 a telephone call InCall coming from the Privat CAS network 13 and received in the ISDN PBX network 14 will be handled in accordance with the invention. Suppose incoming call has directory number 2022.

The incoming CAS trunk 15 has to be set-up for BC conversion. This means that the Central Processor in the PBX have information on which incoming trunks shall be subject to a possible BC conversion. In this example incoming calls both from the Privat CAS network and the National ISDN network will be subject matter to this inventive method including a possible bearer capability conversion. If the call is incoming from another network on a DPNSS/DASS trunk the similar procedure has to be performed in order to set-up the trunk for bearer capability conversion. However, in that case only a limited number of bearer capability classes is being used.

At step 52 a Central Processor CP in the PBX 14 gets information that the incoming call is from a CAS network and a bearer capability class has to be established for the incoming call. This is done by implementing the inventive method on the incoming call.

At step 54 a first bearer capability class is set to the incoming call. A default bearer capability class is being set. This is done by setting bearer capability for the call in the associated ISDN D-channel which is used for signalling. The bearer capability class is defined by using five bits in octet number three in the ISDN protocol. This is known technology and is therefore not described in more details within this document.

At step 56 the Central Processor within the PBX is giving the ISDN applications A–G a unique directory number and preparing a bearer capability conversion table for these applications (see FIG. 2). This step could preferably be done when the ISDN applications are implemented in the exchange. The bearer capability conversion table includes all the directory numbers or families of directory numbers which have bearer capabilities which are differing from the default bearer capability SPEECH.

At step 58 a comparison is done between the directory number of the incoming call (2022) and the directory numbers in the bearer capability conversion table. If a directory number in the table is equivalent to the incoming call directory number a bearer capability conversion is done. The comparison is done in comparison means 22 within the exchange. The directory number of the incoming call is stored in a memory 21 connected to the Central Processor. Thus, the comparison is done between the incoming directory number in memory 21 and the directory numbers in the bearer capability conversion table.

At step 60 the bearer capability BC1=SPEECH is, in this example, converted to 64 kbit Unrestricted. This is done by changing the bearer capability information in the D-channel.

At step 62 the call is connected to the called terminal or the call setup is being proceeded. For instance the call may be a call to the second Privat PBX 20 in FIG. 1 and in that case the call is transmitted from the first PBX 14 to the second one. When the call is arriving in the second PBX 20 it doesn't need any bearer capability conversion. Calls incoming on line 24 should not be BC converted, because they already have the right bearer capability.

A second embodiment of this invention is to directly do the comparation without setting any default bearer capability class. If the comparation results in a hit the required bearer capability class should be set otherwise the default bearer capability class should be used.

What is claimed is:

1. A method of establishing a bearer capability class of a received, incoming call to an ISDN exchange, the received call has a directory number, but no or faulty bearer capability classification, the method comprising the following steps:

setting bearer capability class of the incoming call to a default bearer capability class;

aloting unique directory numbers to ISDN terminals/applications connected to the exchange, which ISDN terminals/applications require a bearer capability class differing from the default class;

comparing the directory number of the incoming call with allotted unique directory numbers which bearer capability classes differ from the default bearer capability class and, if the directory number of the incoming call is equivalent to any of the directory numbers with a bearer capability class differing from default then converting the bearer capability class of the incoming call to the specified class and proceed with call set up.

2. A method in accordance with claim 1 wherein the default bearer capability class is SPEECH.

3. A method in accordance with claim 1 further comprising the following step:

if the directory number of the incoming call is not equivalent to any of the directory numbers within the second group of bearer capability classes then proceed with call setup.

4. Arrangement of establishing bearer capability class of a received, incoming call to an ISDN exchange, the received call has a directory number, but no or faulty bearer capability class, the arrangement comprising the following steps:

means for setting bearer capability class of the incoming call to a default bearer capability class;

menas for alloting unique directory numbers to ISDN terminals/applications connected to the exchange, which ISDN terminals/applications require a bearer capability class differing from the default class;

means for comparing the directory number of the incoming call with allotted unique directory numbers which which bearer capability classes differ from the default bearer capability class and, if the directory number of the incoming call is equivalent to any of the directory numbers with a bearer capability class differing from default then means for converting the bearer capability classification of the incoming call to the specified class.

5. A method of establishing bearer capability class of a received, incoming call to an ISDN exchange, the received call has a directory number, but no or faulty bearer capability class, the method comprising the following steps:

determining a default ISDN bearer capability class;

alloting unique directory numbers to ISDN terminals/applications connected to the exchange, which ISDN terminals/applications require a bearer capability class differing from the default capability class;

comparing the directory number of the incoming call with allotted unique directory numbers which bearer capability classes differ from the default bearer capability class and, if the directory number of the incoming call is equivalent to any of the directory numbers with a bearer capability class differing from default then setting the bearer capability class of the incoming call to the required class; otherwise setting the default bearer capability class and proceed with call set up.

\* \* \* \* \*